United States Patent [19]

Ishii et al.

[11] Patent Number: 4,540,131

[45] Date of Patent: Sep. 10, 1985

[54] ROLLED SHEET PAYING OUT TRANSFER APPARATUS

[75] Inventors: Ryutaro Ishii, Mitaka; Yuichiro Ogawa, Fuchu, both of Japan

[73] Assignee: Bridgestone Tire Company Limited, Tokyo, Japan

[21] Appl. No.: 561,112

[22] Filed: Dec. 13, 1983

[30] Foreign Application Priority Data

Dec. 14, 1982 [JP] Japan ............... 57-217725

[51] Int. Cl.$^3$ .............. B29H 17/00; B29H 17/10; B29H 17/20
[52] U.S. Cl. ....................... 242/55; 242/65; 156/405.1; 198/688.1
[58] Field of Search .............. 242/55, 57, 59, 65, 242/67.2, 67.3; 156/133, 394.1, 395, 405.1; 29/DIG. 78; 198/688, 689, 690, 691

[56] References Cited

U.S. PATENT DOCUMENTS

| | | | |
|---|---|---|---|
| 494,492 | 3/1893 | Schofield | 242/65 X |
| 1,370,268 | 3/1921 | Batchelder | 242/65 X |
| 1,876,633 | 3/1928 | Desautels | 156/405.1 X |
| 3,279,718 | 10/1966 | Arterton et al. | 242/65 X |
| 3,647,126 | 3/1972 | Dieterich et al. | 156/405.1 X |
| 4,120,717 | 10/1978 | Rost | 156/395 |
| 4,159,807 | 7/1979 | Honsel et al. | 242/57 |
| 4,457,802 | 7/1984 | Yanagihara | 156/405.1 |

OTHER PUBLICATIONS

WO83/00838, Sumitomo Rubber, 3/1983.

*Primary Examiner*—Stuart S. Levy
*Assistant Examiner*—Lloyd D. Doigan
*Attorney, Agent, or Firm*—Sughrue, Mion, Zinn, Macpeak, and Seas

[57] ABSTRACT

A rolled sheet paying out transfer apparatus comprises a support frame for supporting a rolled sheet having a liner interposed between turns of the rolled sheets so as to paying out the sheet by winding up the liner, an intermediate conveyor for holding the paid sheet separately from the liner with the aid of an attractive force and introducing the sheet toward a delivery conveyor, and a pushing-down roller for pushing down the sheet at a termination of the intermediate conveyor so as to transfer the sheet onto the delivery conveyor.

The apparatus according to the invention automatically holding the sheet immediately below a starting end of the intermediate conveyor, introducing the sheet toward the delivery conveyor, and transferring the front end of the sheet onto the delivery conveyor, without requiring any trouble-some manual operation as required in the prior art.

15 Claims, 6 Drawing Figures

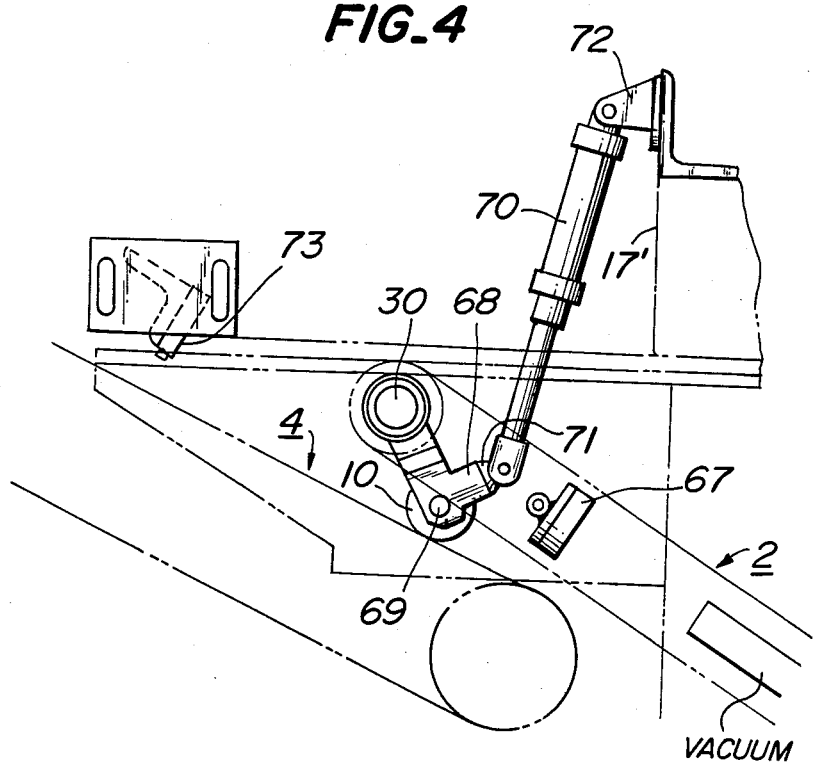

ROLLED SHEET PAYING OUT TRANSFER APPARATUS

BACKGROUND OF THE INVENTION

1. Field of the Invention

This invention relates to an apparatus for paying out a sheet from a roll of the sheet having a liner interposed between turns of the rolled sheet and transferring the sheet to sheet treating equipment.

2. Description of the Prior Art

In manufacturing, for example, pneumatic tires, carcass plies are attached to each other on a building drum for forming a so-called "green case" in an initial forming step, in order to mainly reinforce the tire. In this case, the carcass ply is a rubber coated steel cord tire fabric or textile cord tire fabric which is previously rolled into a roll having a liner interposed between turns of the tire fabric in order to avoid the turns from sticking to each other. In use, the tire fabric is paid out from the roll together with the liner, but only the tire fabric is supplied with its constant length to a next processing equipment such as the above mentioned building drum.

The term "rolled sheet" used herein means such a roll of a sheet with a liner interposed between turns of the sheet.

The rolled sheet of the above mentioned rubber coated tire fabric is generally supplied by a delivery conveyor terminating in immediately above a building drum usually supported rotatably about a horizontal axis onto the building drum on which the tire fabric is severed into required lengths to be attached to form a tire skeleton. In this case, it is difficult to introduce or guide a tire fabric from a rolled sheet onto a delivery conveyor because there has been no suitable means for this purpose. With large tires, particularly, considerably difficult tasks are required such as paying out a rubber coated tire fabric having a great width in a narrow space below an acceptance end of a delivery conveyor and then manually transferring onto the delivery conveyor the tire fabric being supported from falling by gravity.

SUMMARY OF THE INVENTION

It is therefore an object of the invention to provide a rolled sheet paying out transfer apparatus capable of simply and securely introducing a sheet from a rolled sheet onto a delivery conveyor, thereby eliminating the difficult operation hitherto required.

In order to achieve the object, the rolled sheet paying out transfer apparatus according to the invention comprises a support frame for supporting a rolled sheet having a liner interposed between turns of the rolled sheet so as to paying out said sheet by winding up said liner, intermediate conveyor means for holding said paid sheet separately from said liner with the aid of an attractive force and introducing said sheet toward delivery conveyor means, and pushing-down roller means for pushing down said sheet at a termination of said intermediate conveyor means so as to transfer the sheet onto the delivery conveyor means.

The apparatus according to the invention can automatically carry out a series of operations of paying out a sheet from a rolled sheet supported by the support frame by winding up a liner interposed between turns of the rolled sheet, holding the sheet with an attractive force immediately below a starting end of the intermediate conveyor, introducing the sheet toward a delivery conveyor, and transferring a front end of the sheet onto the delivery conveyor at a termination of the intermediate conveyor.

In order that the invention may be more clearly understood, preferred embodiments will be described, by way of example, with reference to the accompanying drawings.

BRIEF DESCRIPTION OF THE DRAWINGS

FIG. 4 is a side view of a pushing-down roller used in the apparatus shown in FIG. 1.

DETAILED DESCRIPTION OF THE PREFERRED EMBODIMENT

Figure 1:
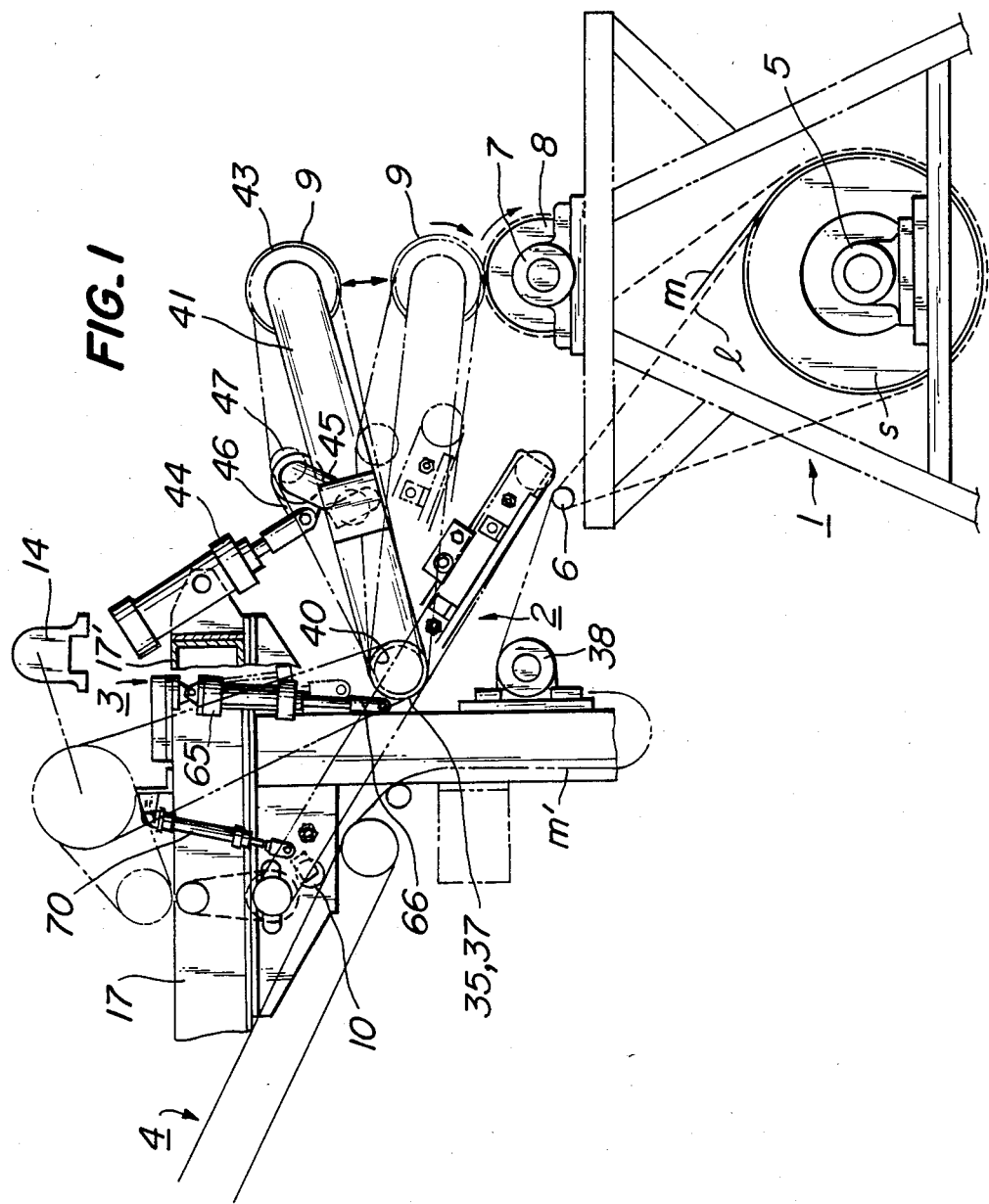
FIG. 1 is a side view of one embodiment of the apparatus according to the invention.

Referring to FIG. 1 illustrating one embodiment of the rolled sheet paying out transfer apparatus according to the invention, a rolled sheet s is supported by a support frame 1, from which a sheet m is paid out and fed through an intermediate conveyor 2 driven by a driving system supported by a frame 3 onto a delivery conveyor 4.

The rolled sheet s consists of a sheet material m such as a rubber coated tire fabric and a liner 1 interposed between the rolled turns of the tire fabric in order to avoid the turns from adhering. The rolled sheet is rotatably supported by bearings 5 at a lower portion of the support frame 1 which is preferably in the form of a trolley (not shown). The liner 1 having an extra longer portion extends about a guide roller 6 rotatably supported at a front upper portion of the support frame 1 and again over about a half circumference of the rolled sheet s and is then wound up about a liner winding-up roller 8 supported by a bearing 7 at a center of a top of the support frame 1. The liner winding-up roller 8 is driven by a touch roller 9 in contact with an outer circumference of the liner winding-up roller 8. It should be understood in this manner that the sheet material m is wound off or paid out of the rolled sheet s together with the liner 1.

When the sheet material m arrives at the guide roller 6 and is in opposition to an underside of the intermediate conveyor 2, the sheet material m is magnetically attracted by the intermediate conveyor 2 with steel cords contained in the sheet material m or an iron piece provided at a front end of the sheet material m or otherwise with the aid of vacuum attracting means, so that the sheet material m is easily carried along the underside of the intermediate conveyor 2.

When the front end of the sheet material m arrives at the terminal end of the intermediate conveyor 2, the sheet material is transferred onto the feeding conveyor 4 by means of a pushing-down roller 10 adapted to be actuated by means of an optical element such as a photoelectric tube for detecting the front end of the sheet material m.

The frame 3 supports thereon driving systems for driving the intermediate conveyor 2 and the touch roller 9 and actuating the conveyor 2 and roller 9 is synchronism with the operation of the pushing-down roller 10.

Figure 2A:
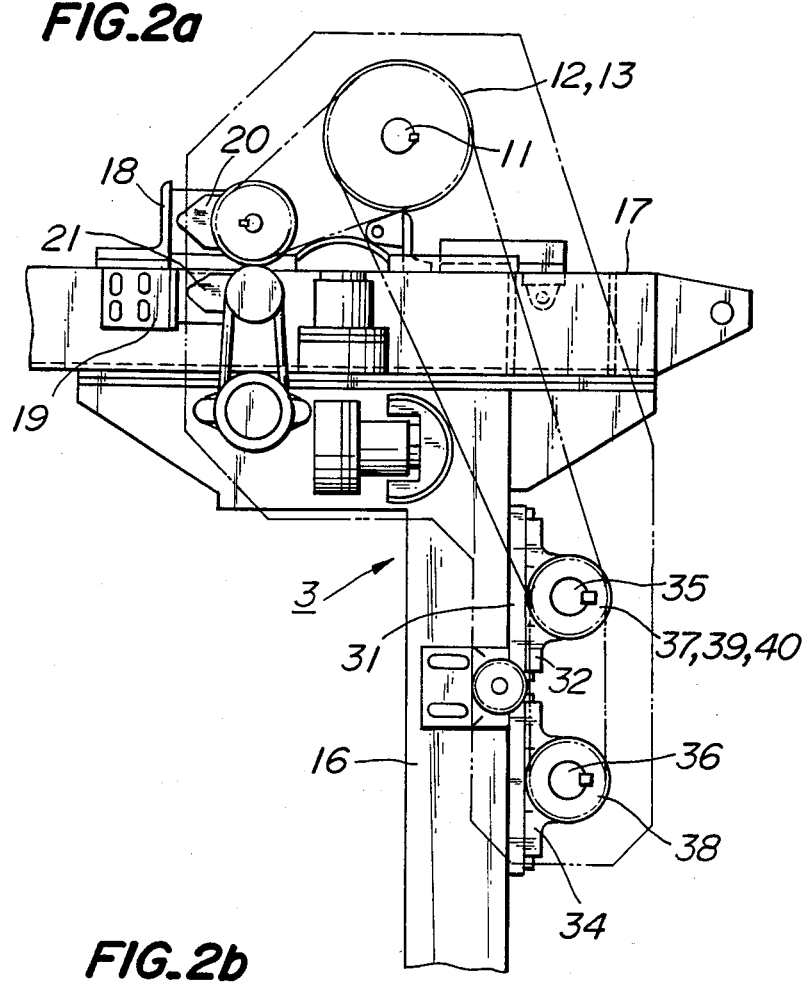
FIGS. 2a, 2b and 2c illustrate important parts of the apparatus shown in FIG. 1, particularly its driving system.
Figure 2B:
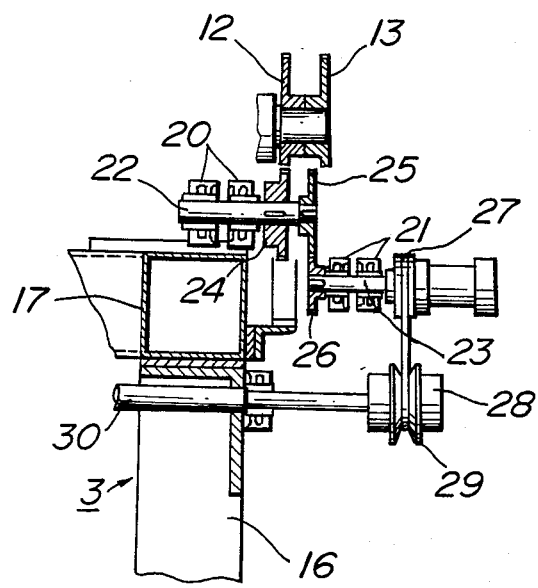
Figure 2C:
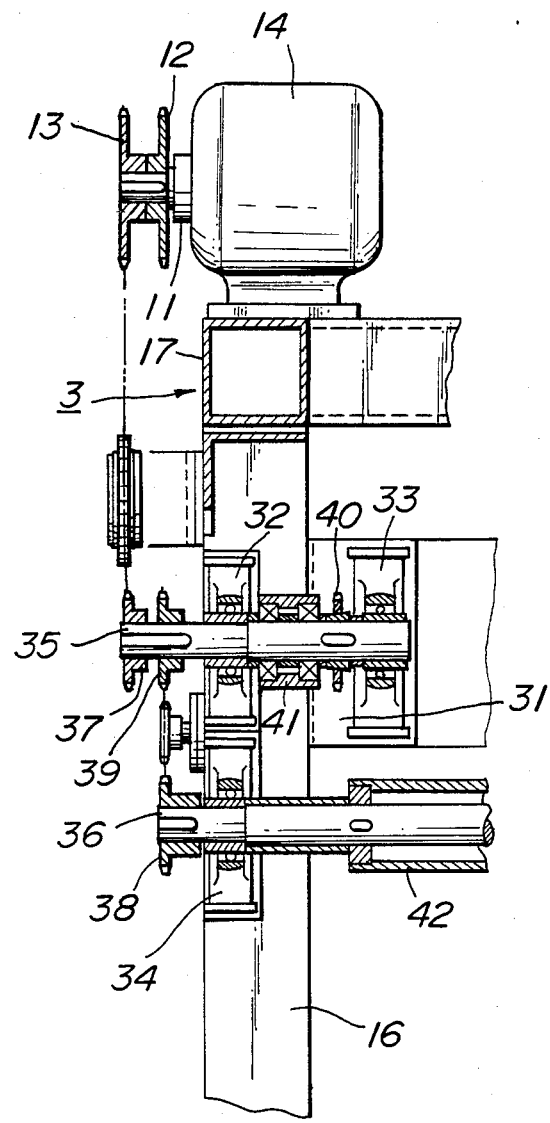

FIGS. 2a 2b and 2c are side, front and back views of the main part of the driving system supported by the frame 3.

A motor 14 having dual sprocket wheels 12 and 13 mounted on a motor shaft 11 of the motor 14 is arranged on a main frame including of a pair of columns 16 and a pair of longitudinal beams 17.

On a front side of the one of the longitudinal beams 17 are provided brackets 18 and 19 for supporting bearings 20 and 21 mounted thereon, which in turn rotatably support intermediate shafts 22 and 23, respectively. A sprocket wheel 24 and a gear 25 are mounted on the shaft 22, and a gear 26 and a pulley 27 are mounted on the shaft 23 which drives through a belt a pulley 29 having a stepless speed change device 28 built therein. These sprocket wheels, gears and pulleys form a driving system for driving the intermediate conveyor 2. The pulley 29 includes a main shaft 30.

Bearings 32 and 33 for supporting a short shaft 35 are mounted directly on and indirectly through a bracket 31 on the column 16. A bearing 34 is mounted immediately below the bearing 32 on the column 16 for a long shaft 36. The short shaft 35 is provided with a sprocket wheel 37 corresponding to the sprocket wheel 13 of the motor shaft 11, a sprocket wheel 39 corresponding to a sprocket wheel 38 provided on the long shaft 36, and a sprocket wheel 40 for driving the touch roller 9. The short shaft 35 further rotatably supports a holding frame 41 for the touch roller 9. A preliminary guide roller 42 is mounted on the long shaft 36.

Referring back to FIG. 1, the holding frame 41 rotatably supports at its one end a sprocket wheel 43 for driving the touch roller 9 by a chain transmission system of the sprockets 13, 37, 40 and 43. A cross beam 17' connecting rear ends of the longitudinal beams 17 pivotally supports extending and retracting means 44, for example, a hydraulic cylinder whose a piston rod is pivotally connected to a yoke 46 of a stay pipe 45 in the form of a crank provided on the holding frame 41 for adjusting the position of the touch roller 9 relative to the liner winding-up roller 8. The stay pipe 45 is formed in a crank shape so that when the holding frame 41 assumes its lowered position as shown by chain lines in FIG. 1, the holding frame 41 is offset from a running path of the intermediate conveyor 2 driven by a chain as described later. A roller 47 serves as a tension roller for a chain for driving the sprockets 40 and 43.

Moreover, the preliminary guide roller 42 serves to form a loop of the sheet material m in the form of a festoon m' as shown by a phantom line in FIG. 1 in order to admit a difference in feeding speed of the sheet material m between the liner winding-up roller 8 and the delivery conveyor 4.

Figure 3:
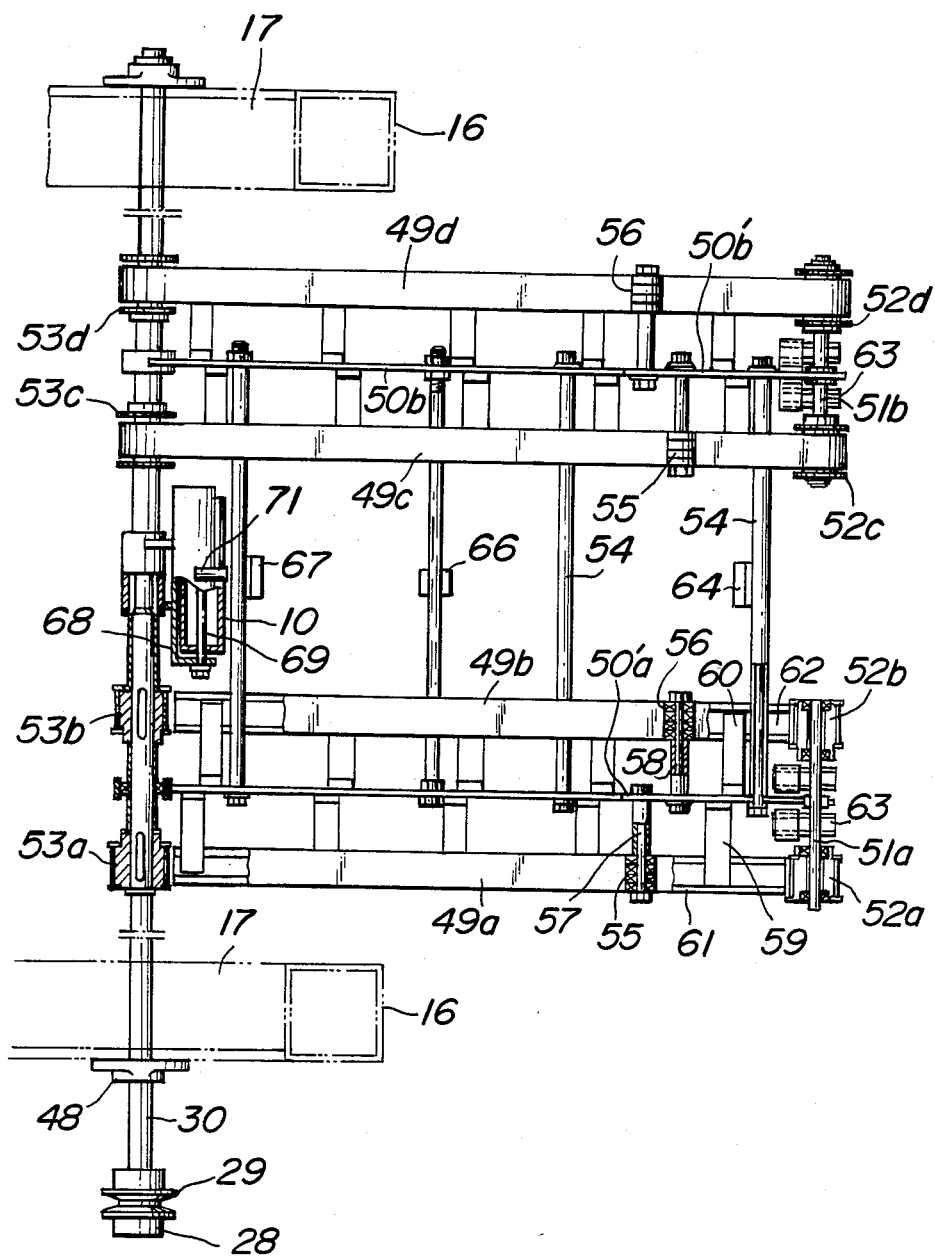
FIG. 3 is a plan view of an intermediate conveyor used in the apparatus shown in FIG. 1.

The main shaft 30 is supported at its ends by bearings 48 and at its midway by a pair of holding frames 50a and 50b for pulley-driving four magnetic belts 49a–49d as shown in FIG. 3. Cross shafts 51a and 51b are fixed to free ends of the holding frames 50a and 50b for rotatably supporting driven pulleys 52a, 52b, 52c and 52d, respectively corresponding to pulleys 53a, 53b, 53c and 53d fixed to the main shaft 30.

Moreover, the holding frames 50a and 50b are held by stay pipes 54 and are formed with raised portions 50a and 50b which are provided with cross pins 57 and 58 extending in opposite directions for rotatably supporting tension rollers 55 and 56 for the magnetic belts 49a–49d.

The holding frames 50a and 50b are also provided with a plurality of brackets 59 and 60 secured thereto and extending in opposite directions for holding magnet holders 61 and 62 as attracting means on back side of lower runs of the magnetic belts 49a–49d. Furthermore, auxiliary magnet holders 63 may be provided at the free ends of the holding frames 50a and 50b, if required.

On the stay pipe 54 nearest to the free ends of the holding frames 50a and 50b is mounted an optical element such as a photoelectric tube 64 for detecting a commencement of the holding of the front end of the sheet material m by the attracting means. To the intermediate stay pipe 54 is rotatably mounted an eye piece 66 of a piston rod of extending and retracting means 65, for example, a hydraulic cylinder pivotally secured to the cross beam 17' as shown in FIG. 1. Furthermore, on the stay pipe 54 nearest to the end of the holding frames 50a and 50b rotatably supporting the main shaft 30 is mounted an optical element, for example, a photoelectric tube 67 adapted to be actuated in response to an introduction of the sheet material m.

Upon an actuation of the photoelectric tube 67, the pushing-down roller 10 pivotally supported on a cross shaft 69 in a rockable frame 68 pivotally movable on the main shaft 30 is lowered by means of a piston rod of extending and retracting means 70, for example, a hydraulic cylinder shown in FIG. 1 to transfer the sheet material m from the intermediate conveyor 2 onto the delivery conveyor 4. An eye member 71 serves to connect the rockable frame 68 with a yoke of the piston rod of the hydraulic cylinder 70 (FIG. 4).

Referring to FIG. 4 illustrating the relative arrangement of the pushing-down roller 10 to the other components in detail, an upper end of the extending and retracting means 70 is pivotally secured to a bracket 72 on the cross beam 17' of the frame 3 to bring the pushing-down roller 10 into the pushed position in response to a signal generated from the photoelectric tube 67 upon detecting the sheet material m. A reference numeral 73 in FIG. 4 illustrates an optical element, for example, a photoelectric tube for detecting the arrival of the sheet material m transferred onto the delivery conveyor 4.

As can be seen from the above description, in order that the intermediate conveyor 2 magnetically attracts the front end of the sheet material m which is a steel cord tire fabric or provided at the front end with an iron piece and which advances toward the guide roller 6 by carrying by the liner 1 being wound up by the roller 8, the position of the intermediate conveyor 2 is adjusted by the extending and retracting means 65, while the touch roller 9 is maintained by the extending and retracting means 44 in a suitable position for frictionally driving the liner 1 being wound up on the liner winding-up roller 8.

In this manner, the photoelectric tube 64 detects the sheet material m being attracted and held by the intermediate conveyor 2 and then the photoelectric tube 67 detects the sheet material m approaching the delivery conveyor 4 to actuate the pushing-down roller 10 with the aid of the extending and retracting means 70 so as to transfer the sheet material m onto the delivery conveyor 4.

Instead of the magnetic attraction, the intermediate conveyor 2 may utilize vacuum means to attract and hold the sheet material m thereon, which of course enables the conveyor to attract the sheet material irrespective of its kind not including steel cords.

The delivery conveyor 4 serves to introduce the sheet material m onto, for example, a building drum for forming skeletons of tires. After the sheet material m has been transferred onto the delivery conveyor 4, the intermediate conveyor 2 need not be operated, so that the extending and retracting means 65 is retracted to bring the intermediate conveyor 2 into its waiting position.

The sheet material m is then held by the preliminary guide roller 42, so that the sheet material m fed during a resting time of the delivery conveyor 4 in connection with the forming operation of the building drum forms a loop in the form of the festoon of the sheet material shown by m' in FIG. 1 owing to its retardation due to the stoppage of the delivery conveyor 4, thereby permitting the touch roller 9 to be continuously rotated.

As can be seen from the above explanation, the apparatus according to the invention can securely transfer with ease onto a delivery conveyor an adhesive sheet material requiring a liner interposed between turns of the sheet material by introducing a front end of the sheet material by means of a simply constructed intermediate conveyor without requiring any manual operation, thereby eliminating the trouble-some operation particularly in case of a wide sheet material for transferring it onto a delivery conveyor in the prior art.

It is further understood by those skilled in the art that the foregoing description is that of preferred embodiments of the disclosed apparatus and that various changes and modifications may be made in the invention without departing from the spirit and scope thereof.

What is claimed is:

1. A rolled sheet paying out transfer apparatus comprising a support frame for supporting a rolled sheet having a liner interposed between turns of the rolled sheet so as to paying out said sheet by winding up said liner, intermediate conveyor means for holding on an underside portion thereof said paid sheet separately from said liner with the aid of an attractive force and introducing said sheet toward delivery conveyor means, and pushing-down roller means for pushing down said sheet at a termination of said intermediate conveyor means so as to transfer the sheet from the underside of said intermediate conveyor means onto an upper surface of said delivery conveyor means.

2. An apparatus as set forth in claim 1, wherein said intermediate conveyor means comprises a magnetic belt having magnetic means to cause said attractive force for attracting steel cords contained in the sheet or an iron piece provided on a front end of the sheet.

3. An apparatus as set forth in claim 1, wherein vacuum means is provided on said intermediate conveyor means to cause said attractive force for attracting said sheet against the intermediate conveyor means.

4. An apparatus as set forth in claim 1, wherein said apparatus comprises a driving source mounted on a frame of the apparatus, and transmission means mounted on said frame and driven from said driving source for driving a liner winding-up roller for winding-up said liner and driving said intermediate conveyor means.

5. An apparatus as set forth in claim 4, wherein said transmission means comprises chain-sprocket drives to synchronize the operations of said liner winding-up roller, said intermediate conveyor means and said pushing down roller means.

6. An apparatus as set forth in claim 4, wherein said transmission means for driving said liner winding-up roller comprises a holding frame having one end pivotally connected to said frame, a touch roller provided on the other end of said holding frame and driving said liner winding-up roller when being in contact therewith, and extending and retracting means pivotally connected its ends to said frame of the apparatus and to said holding frame, respectively, for bringing said touch roller into contact with and away from said liner winding-up roller.

7. An apparatus as set forth in claim 6, wherein said extending and retracting means is a hydraulic piston and cylinder whose piston rod is pivotally connected at its end through a crank-shaped member with said holding frame.

8. An apparatus as set forth in claim 4, wherein a preliminary guide roller is provided so as to be driven in synchronism with said liner winding-up roller to form a loop of the sheet in order to admit a difference in feeding speed of the sheet between the liner winding-up roller and said delivery conveyor means.

9. An apparatus as set forth in claim 4, wherein said transmission means comprises belt-pulley drives to synchronize the operations of said liner winding-up roller, said intermediate conveyor means and said pushing-down roller means.

10. An apparatus as set forth in claim 4, wherein said transmission means comprises gears to synchronize the operations of said liner winding-up roller, said intermediate conveyor means and said pushing down roller means.

11. An apparatus as set forth in claim 1, wherein a hydraulic piston and cylinder is pivotally connected at its cylinder and piston rod to said frame of said apparatus and said intermediate conveyor means for adjusting its position.

12. An apparatus as set forth in claim 1, wherein a hydraulic piston and cylinder is pivotally connected at its cylinder and piston to said frame of said apparatus and said pushing-down roller means for moving said pushing-down roller means toward and away from said delivery conveyor means.

13. An apparatus as set forth in claim 1, wherein a photoelectric tube is provided for detecting a moment when the intermediate conveyor means holds a front end of said sheet.

14. An apparatus as set forth in claim 1, wherein a photoelectric tube is provided for detecting a front end of the sheet approaching said delivery conveyor to generate a signal for actuating said pushing-down roller means.

15. An apparatus as set forth in claim 1, wherein a photoelectric tube is provided for detecting an arrival of said sheet onto said delivery conveyor means.

* * * * *